(12) United States Patent  (10) Patent No.: US 8,568,065 B2
Neiman et al.  (45) Date of Patent: Oct. 29, 2013

(54) CUTTING TOOL AND INSERT HOLDER FOR TANGENTIAL CUTTING INSERT

(75) Inventors: Grigori Neiman, Kiryat Ata (IL); Yuri Davidov, Maalot (IL)

(73) Assignee: Iscar, Ltd., Tefen (IL)

( * ) Notice: Subject to any disclaimer, the term of this patent is extended or adjusted under 35 U.S.C. 154(b) by 305 days.

(21) Appl. No.: 13/240,029

(22) Filed: Sep. 22, 2011

(65) Prior Publication Data

US 2012/0121345 A1  May 17, 2012

(30) Foreign Application Priority Data

Nov. 17, 2010  (IL) .......................................... 209396

(51) Int. Cl.
*B23B 27/16* (2006.01)
(52) U.S. Cl.
USPC ............................ 407/103; 407/101; 407/113
(58) Field of Classification Search
CPC ....................................................... B23B 27/16
USPC .......... 407/113, 101, 103, 102, 107, 108, 111
See application file for complete search history.

(56) References Cited

U.S. PATENT DOCUMENTS

| | | | |
|---|---|---|---|
| 3,121,939 A * | 2/1964 | Williams | 407/103 |
| 5,888,029 A | 3/1999 | Boianjiu | |
| 7,073,987 B2 | 7/2006 | Hecht | |
| 2006/0210365 A1* | 9/2006 | Hecht | 407/103 |
| 2007/0280790 A1 | 12/2007 | Kovac | |
| 2010/0254775 A1* | 10/2010 | Hecht | 407/103 |

FOREIGN PATENT DOCUMENTS

| | | | | |
|---|---|---|---|---|
| JP | 2000-246515 A | * | 9/2000 | B23B 27/16 |
| WO | WO 97/27019 | * | 7/1997 | B23B 27/16 |

OTHER PUBLICATIONS

International Search Report dated Feb. 2, 2012 issued in counterpart PCT Application (No. PCT/IL2011/000773).

* cited by examiner

*Primary Examiner* — Daniel Howell
*Assistant Examiner* — Ryan Rufo
(74) *Attorney, Agent, or Firm* — Womble Carlyle

(57) ABSTRACT

A cutting tool has an insert holder for retaining a tangential cutting insert in an insert pocket. The insert pocket has a bottom surface, a rear surface and a base surface. The base surface has three abutment protuberances that extend from the base surface. Each base abutment protuberance has a respective base abutment surface. The three base abutment surfaces abut the cutting insert at three points to provide stable seating of the cutting insert in the insert pocket.

16 Claims, 7 Drawing Sheets

CUTTING TOOL AND INSERT HOLDER FOR TANGENTIAL CUTTING INSERT

FIELD OF THE INVENTION

The subject matter of the present application relates to insert holders of the type in which a tangential cutting insert is releasably retained in an insert pocket of an insert holder.

BACKGROUND OF THE INVENTION

U.S. Pat. No. 7,073,987 discloses a tangential cutting insert and an insert holder. When seated in the insert pocket of the insert holder, the major side surface of the cutting insert abuts the base surface of the insert holder at four points along two theoretically parallel contact lines.

However, during the manufacture of the cutting insert, specifically during the sintering of the cutting insert, the insert geometry can become distorted and this can lead to the distortion of contact lines, for example they may become non-linear. This in turn can lead to the cutting insert not being seated in a stable position when located in the insert pocket. With such cutting inserts it may not always possible to solve this problem by grinding the major side surfaces. It may be, for example, undesirable to grind the major side surfaces, especially if the major side surfaces extend between the cutting edges and it is undesirable to grind the cutting edges.

SUMMARY OF THE INVENTION

In accordance with the subject matter of the present application there is provided an insert holder, for retaining a tangential cutting insert, the insert holder comprising:
 a holder front surface; and
 an insert pocket comprising:
  a rear surface;
  a bottom surface; and
  a base surface comprising a fastening hole and three spaced apart base abutment protuberances, including a first, a second and a third base abutment protuberance, wherein:
 the first and second base abutment protuberances are located between the holder front surface and the fastening hole;
 the third base abutment protuberance is located between the fastening hole and the rear surface of the insert pocket;
 the second base abutment protuberance is further from the bottom surface than the third base abutment protuberance;
 the third base abutment protuberance is further from the bottom surface than the first base abutment protuberance; and
 the first, second and third base abutment protuberances comprise first, second and third base abutment surfaces, respectively.

Further in accordance with the subject matter of the present application, there is also provided a cutting tool, comprising:
 the insert holder; and
 a tangential cutting insert releasably retained with a fastener in the insert pocket.
The tangential cutting insert may comprise:
 two opposing end surfaces; and
 a peripheral side surface extending therebetween, the peripheral side surface comprising:
  two identical opposing major side surfaces; and
  two identical opposing minor side surfaces, wherein;

in a top view of the cutting insert, each major side surface is concave with a centrally situated recess extending between the end surfaces;
 the first and second base abutment surfaces abut an operative major side surface on one side of the recess; and
 the third base abutment surface abuts the operative major side surface on the other side of the recess.

BRIEF DESCRIPTION OF THE FIGURES

For a better understanding of the subject matter of the present application and to show how the same may be carried out in practice, reference will now be made to the accompanying drawings, in which.

DETAILED DESCRIPTION OF THE INVENTION

In the following description, various aspects of the present application will be described. For purposes of explanation, specific configurations and details are set forth in order to provide a thorough understanding of the present application. However, it will also be apparent to one skilled in the art that the present application may be practiced without the specific details presented herein. Furthermore, well-known features may be omitted or simplified in order not to obscure the present application.

Figure 1:
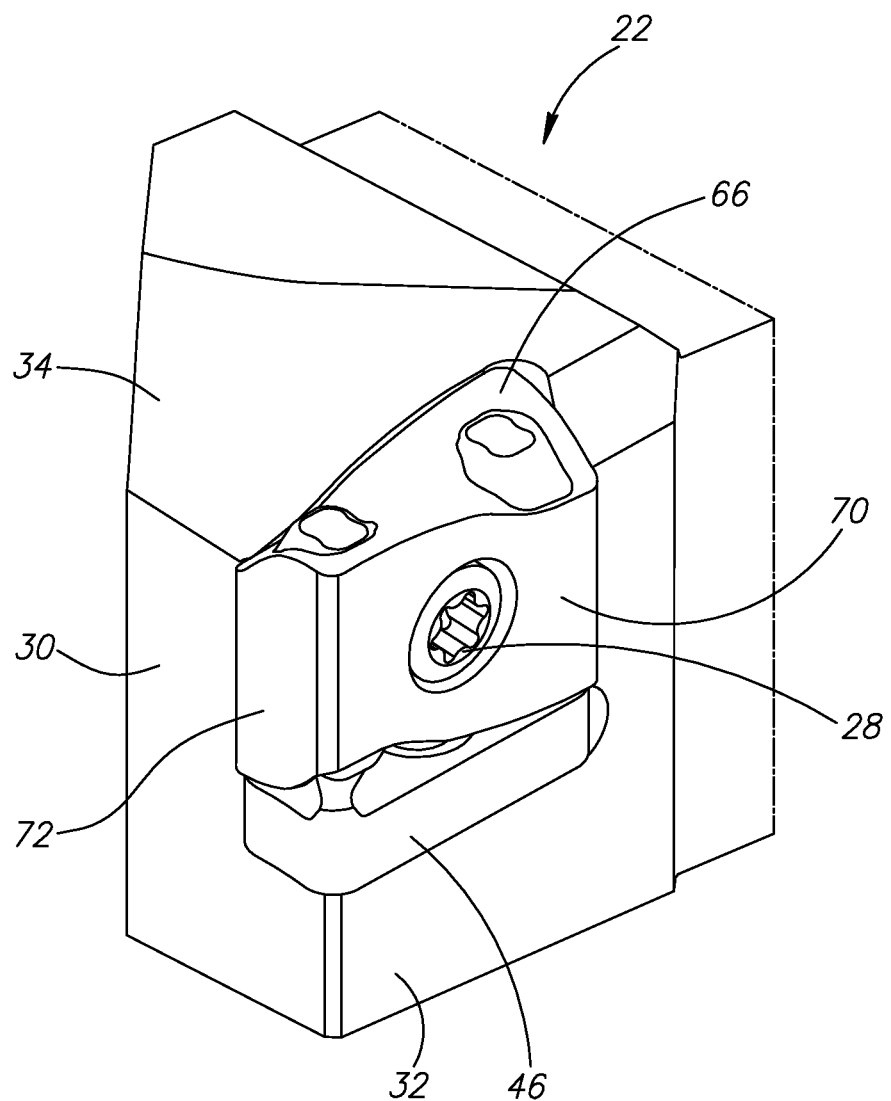
FIG. 1 is a perspective view of a cutting tool.
Figure 2:
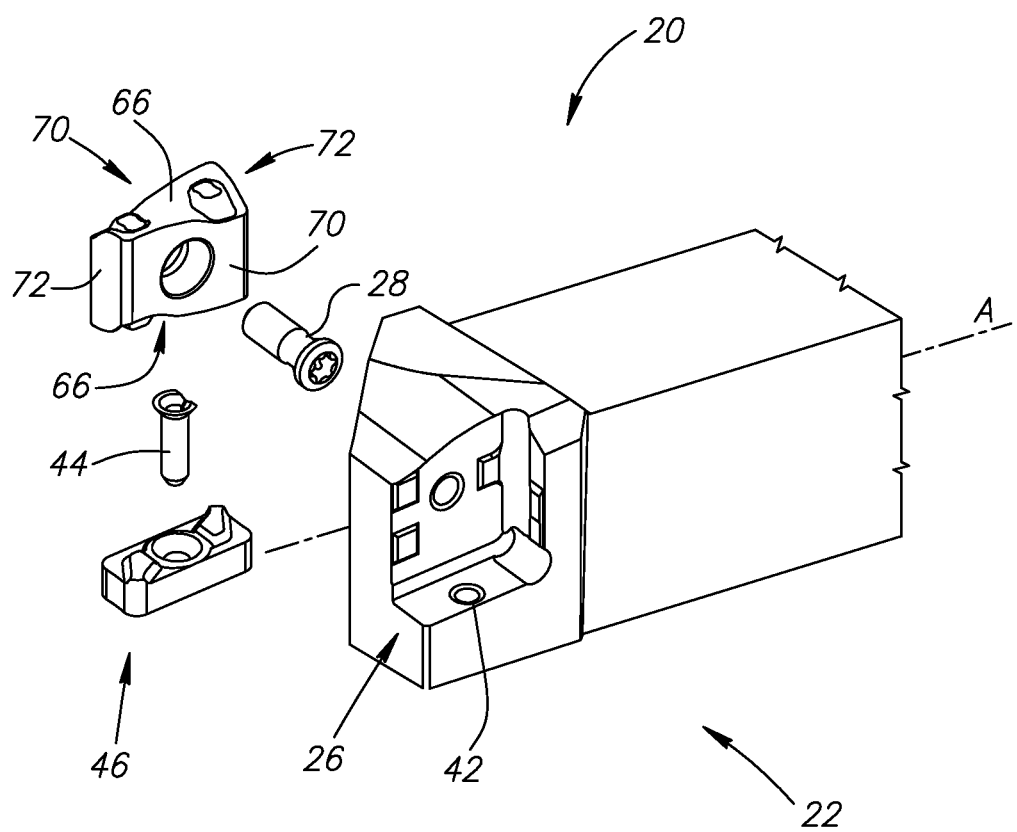
FIG. 2 is an exploded perspective view of the cutting tool shown in FIG. 1.

Attention is first drawn to FIGS. 1 to 2, showing a cutting tool 20. The cutting tool 20 includes an insert holder 22 having an insert pocket 26 with a tangential cutting insert 24 removably retained in the insert pocket 26. The cutting tool 20 has a longitudinal axis A defining a forward to rearward direction, with the cutting insert 24 located at the forward end of the cutting tool 20. The cutting insert 24 is secured in the insert pocket 26 with a fastener 28. The insert holder 22 may be manufactured from a first material and the cutting insert 24 from a second harder material. The insert holder 22 has a holder front surface 30, a holder side surface 32, a holder upper surface 34 and the insert pocket 26.

Reference is made to FIGS. 3 to 6, showing the insert pocket 26. The insert pocket 26 has a bottom surface 36, a rear surface 38 and a base surface 40. The base surface 40, the rear surface 38 and the bottom surface 36 may be mutually perpendicular to each other. The bottom surface 36 may be substantially planar. The bottom surface 36 may have a shim screw hole 42, having a central axis B, for receiving a shim screw 44 in order to secure a shim 46 to the bottom surface 36, as shown, for example, in U.S. Pat. No. 7,073,987.

Figure 6:
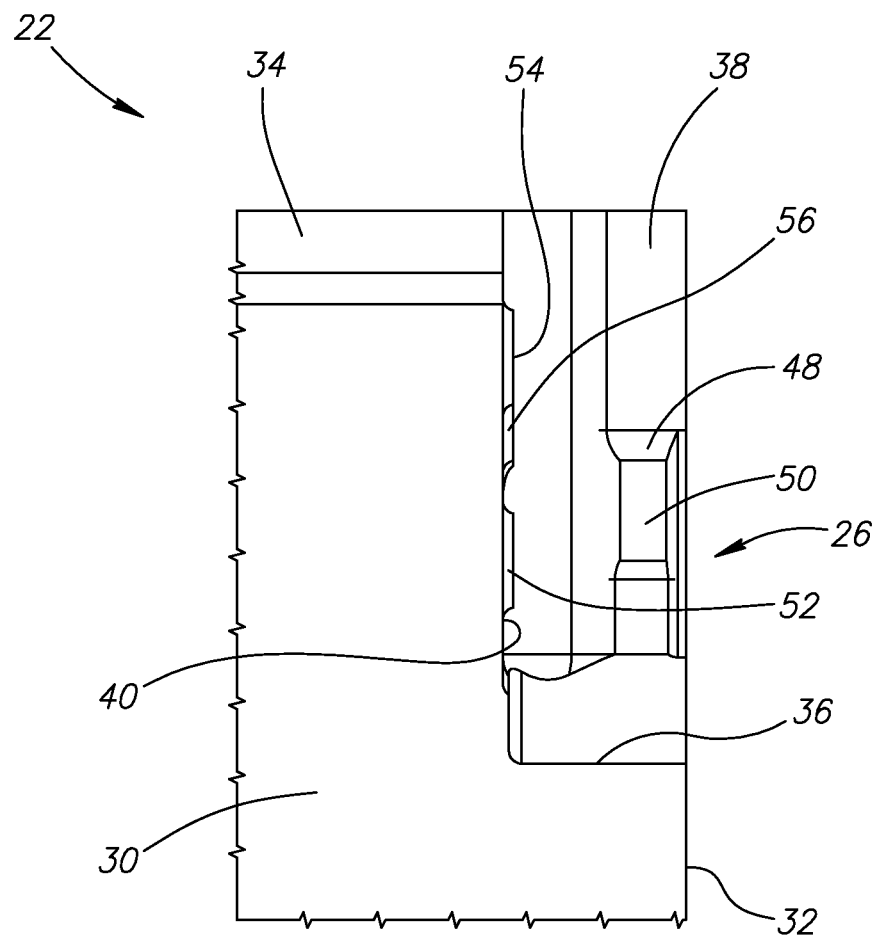
FIG. 6 is a front view of the insert holder shown in FIG. 3.

The rear surface 38 may be substantially planar and has a rear abutment protuberance 48 projecting forwardly therefrom. As seen in FIG. 6, the rear abutment protuberance 48 may be located adjacent the holder side surface 32 and approximately midway between the bottom surface 36 and the holder upper surface 34. The rear abutment protuberance 48 may have a rear abutment surface 50. The rear abutment surface 50 may be flat. The rear abutment protuberance 48 may be rectangular in shape.

Figure 3:
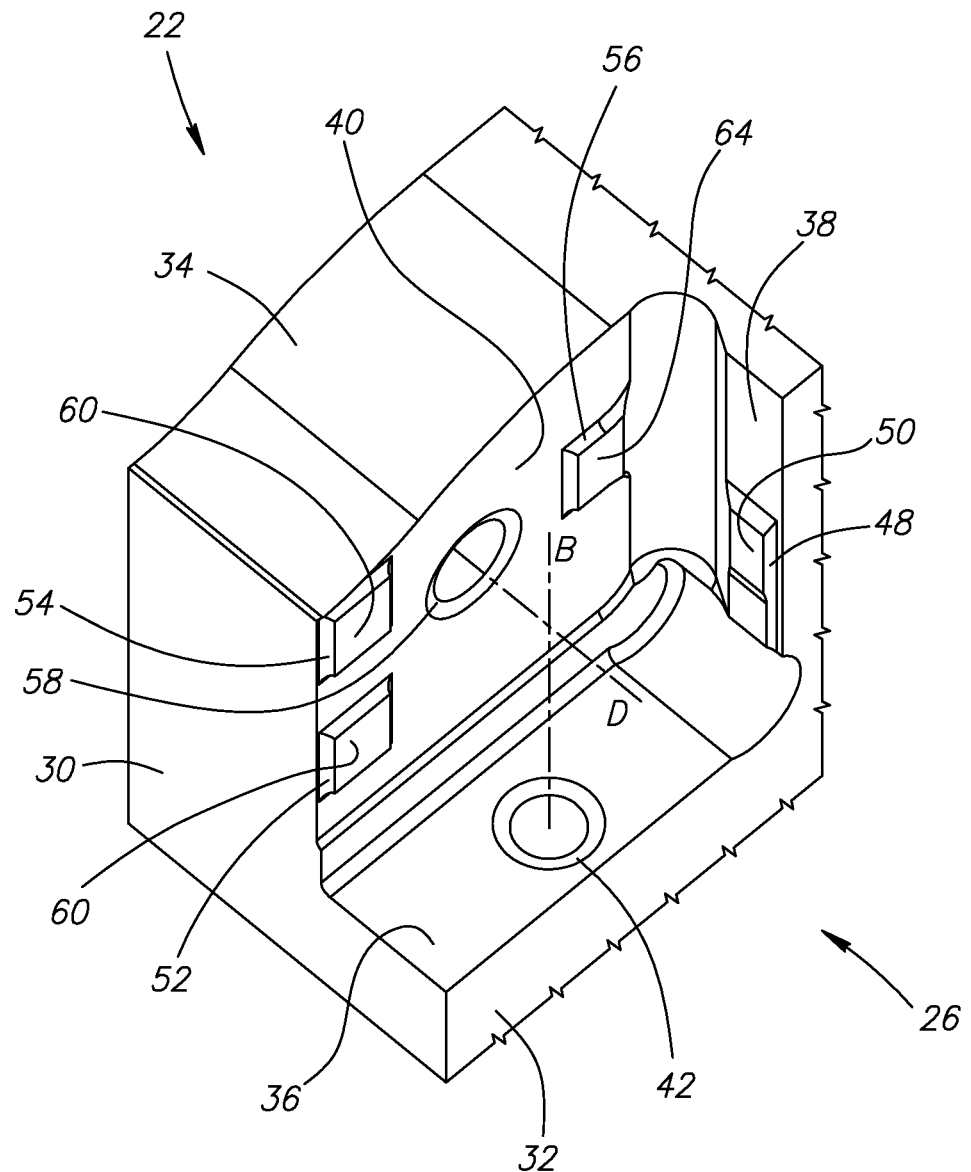
FIG. 3 is a perspective view of an insert holder shown in FIG. 1.
Figure 4:
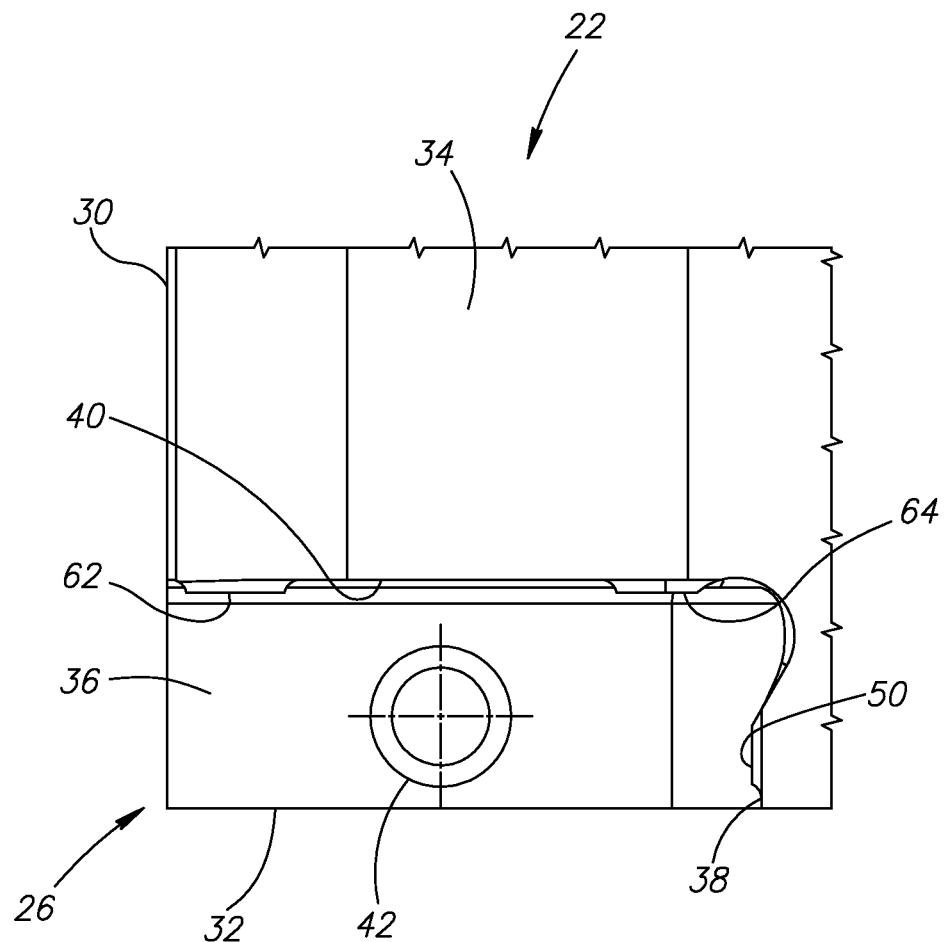
FIG. 4 is a top view of the insert holder shown in FIG. 3.
Figure 5:
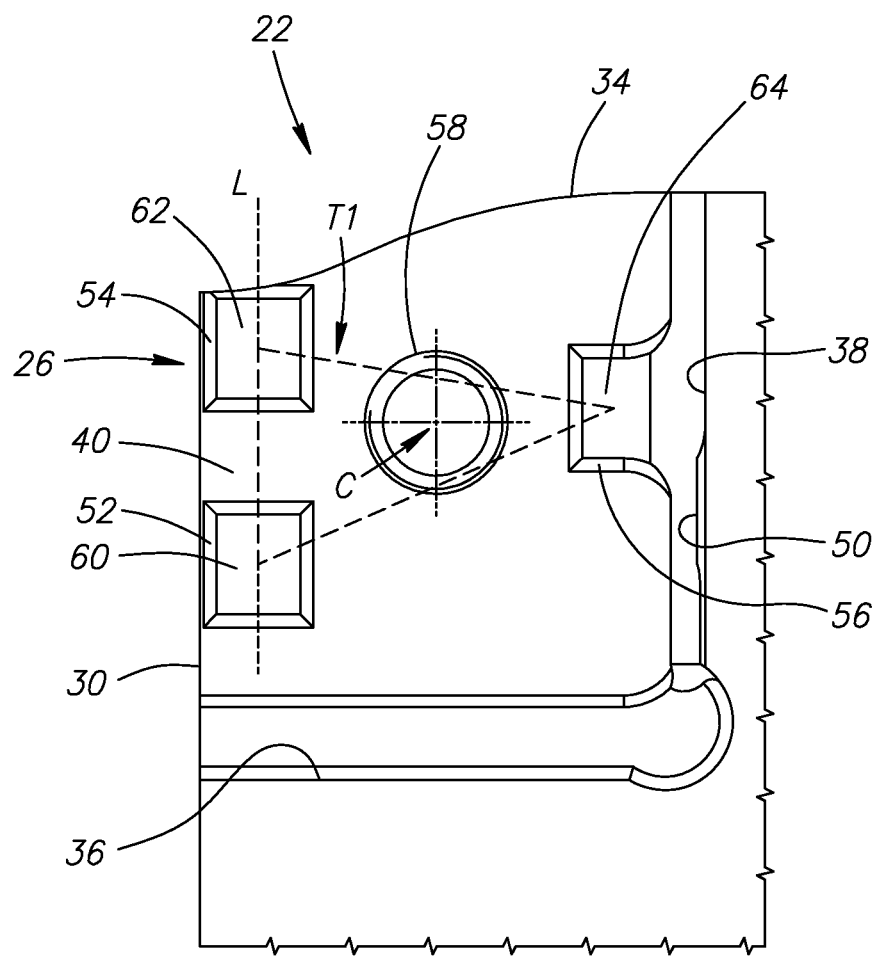
FIG. 5 is a side view of the insert holder shown in FIG. 3.

The base surface 40 may be substantially planar and is provided with three spaced apart base abutment protuberances, a first 52, second 54 and third 56 base abutment protuberance. The base surface 40 is also provided with an insert fastening hole 58, having a center C and a central axis D, the insert fastening hole 58 and the shim screw hole 42 in the bottom surface 36 being generally perpendicular to one another as seen in FIG. 3. That is to say, the central axis B of the shim screw hole 42 and the central axis D of the insert fastening hole 58 are generally perpendicular to each other. The first and second base abutment protuberances 52, 54 are located between the holder front surface 30 and the insert fastening hole 58 and the third base abutment protuberance 56 is located between the insert fastening hole 58 and the rear surface 38 of the insert pocket 26. The first and second base abutment protuberances 52, 54 may be aligned along a line L perpendicular to the bottom surface 36 with the second base abutment protuberance 54 being further from the bottom surface 36 than the third base abutment protuberance 56. The third base abutment protuberance 56 is located further from the bottom surface 36 than the first base abutment protuberance 52 and may be substantially the same distance from the bottom surface 36 as the insert fastening hole 58.

Each base abutment protuberance 52, 54, 56 comprises a respective base abutment surface 60, 62, 64 where each base abutment surface 60, 62, 64 may be flat and the three base abutment surfaces 60, 62, 64 may be coplanar. Each base abutment surface 60, 62, 64 may be rectangular in shape to form a stable abutment region. The base abutment surfaces 60, 62, 64 may be arranged relative to one another on the base surface 40 such that the center C of the insert fastening hole 58 lies within an imaginary triangle T1 connecting the centers of three base abutment surfaces 60, 62, 64. While it is preferred that the three base abutment surfaces 60, 62, 64 be flat and coplanar, in some embodiments the three base abutments surfaces may each have a slightly convex surface which conforms to the contour of a corresponding portion of the insert recess 74 against which abutment occurs, as discussed below.

Figure 7:
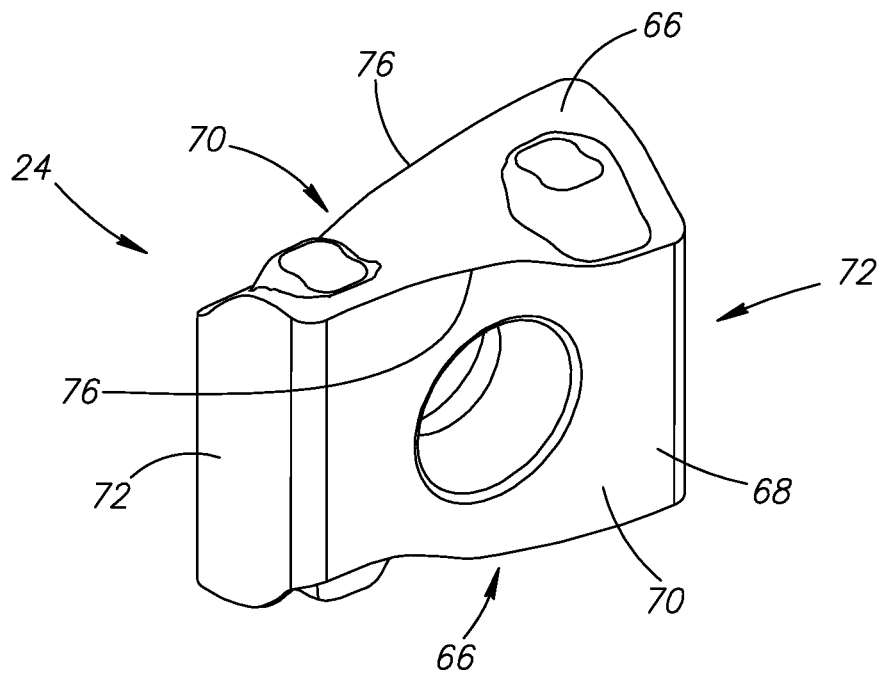
FIG. 7 is a perspective view of a cutting insert shown in FIG. 1.
Figure 8:
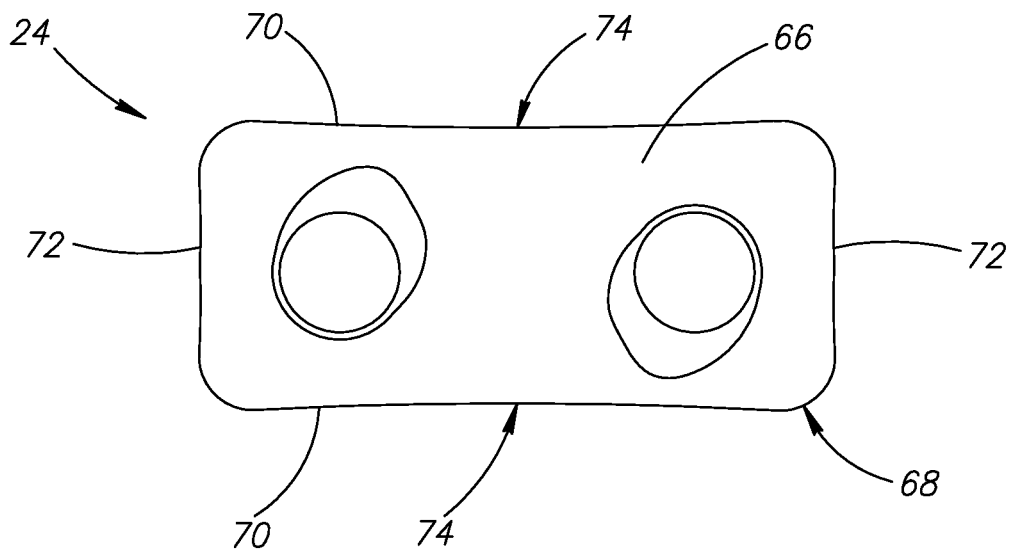
FIG. 8 is a top view of the cutting insert shown in FIG. 7;
 It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

As shown in FIG. 7, the cutting insert 24 has two opposing end surfaces 66 and a peripheral side surface 68 extending between the two end surfaces 66. The peripheral side surface 68 includes two identical opposing major side surfaces 70 and two identical opposing minor side surfaces 72. As shown in FIG. 8, each major side surface 70 of the cutting insert 24 is concave with a centrally situated recess 74 extending between the end surfaces 66. The major side surfaces 70 and the end surfaces 66 meet at major cutting edges 76.

When the cutting insert 24 is seated in the insert pocket 26 an operative major side surface 70, an operative minor side surface 72 and an operative end surface 66 of the cutting insert 24 engage the insert pocket 26 with the first and second base abutment surfaces 60, 62 abutting the operative major side surface 70 at respective first and second abutment regions on one side of the recess 74, the third base abutment surface 64 abutting the operative major side surface 70 at a third abutment region on the other side of the recess 74 and the rear abutment surface 50 abutting the operative minor side surface 72 at a fourth abutment region. The operative end surface 66 of the cutting insert 24 engages the shim 46.

The three base abutment protuberances 52, 54, 56 provide stable seating for the cutting insert 24 even though the operative major side surface 70 of the cutting insert 24 is not planar.

Although the present application has been described to a certain degree of particularity, it should be understood that various alterations and modifications could be made without departing from the spirit or scope of the invention as hereinafter claimed.

What is claimed is:

1. An insert holder (22), for retaining a tangential cutting insert, the insert holder (22) comprising:
   a holder front surface (30); and
   an insert pocket (26) comprising:
      a rear surface (38);
      a bottom surface (36); and
      a base surface (40) comprising an insert fastening hole (58) and three spaced apart base abutment protuberances, including a first, a second and a third base abutment protuberance (52, 54, 56), wherein:
   the first and second base abutment protuberances (52, 54) are located between the holder front surface (30) and the insert fastening hole (58);
   the third base abutment protuberance (56) is located between the insert fastening hole (58) and the rear surface (38) of the insert pocket (26);
   the second base abutment protuberance (54) is further from the bottom surface (36) than the third base abutment protuberance (56);
   the third base abutment protuberance (56) is further from the bottom surface (36) than the first base abutment protuberance (52); and
   the first, second and third base abutment protuberances (52, 54, 56) comprise first, second and third base abutment surfaces (60, 62, 64), respectively.

2. The insert holder (22) according to claim 1, wherein the first, second and third base abutment surfaces (60, 62, 64) are flat and coplanar.

3. The insert holder (22) according to claim 2, wherein
   the first and second base abutment protuberances (52, 54) are aligned along a line (L) perpendicular to the bottom surface (36); and
   the third base abutment protuberance (56) is substantially the same distance from the bottom surface (36) as the insert fastening hole (58).

4. The insert holder (22) according to claim 3, wherein:
   the insert fastening hole (58) has a center (C); and
   the base abutment surfaces (60, 62, 64) are arranged relative to one another on the base surface (40) such that center (C) of the insert fastening hole (58) lies within an imaginary triangle (T1) connecting centers of the three base abutment surfaces (60, 62, 64).

5. The insert holder (22) according to claim 4, wherein the base surface (40), the rear surface (38) and the bottom surface (36) are mutually perpendicular to each other.

6. The insert holder (22) according to claim 5, wherein:
   the bottom surface (36) is provided with a shim screw hole (42); and
   the shim screw hole (42) and the insert fastening hole (58) are generally perpendicular to each other.

7. The insert holder (22) according to claim 1, wherein:
   the first and second base abutment protuberances (52, 54) are aligned along a line (L) perpendicular to the bottom surface (36); and the third base abutment protuberance (56) is substantially the same distance from the bottom surface (36) as the insert fastening hole (58).

8. The insert holder (22) according to claim 7, wherein:
the insert fastening hole (58) has a center (C); and
the base abutment surfaces (60, 62, 64) are arranged relative to one another on the base surface (40) such that center (C) of the insert fastening hole (58) lies within an imaginary triangle (T1) connecting centers of the three base abutment surfaces 60, 62, 64).

9. The insert holder (22) according to claim 1, wherein:
the insert fastening hole (58) has a center (C); and
the base abutment surfaces (60, 62, 64) are arranged relative to one another on the base surface (40) such that center (C) of the insert fastening hole (58) lies within an imaginary triangle (T1) connecting centers of the three base abutment surfaces 60, 62, 64).

10. The insert holder (22) according to claim 9, wherein the base surface (40), the rear surface (38) and the bottom surface (36) are mutually perpendicular to each other.

11. The insert holder (22) according to claim 1, wherein the base surface (40), the rear surface (38) and the bottom surface (36) are mutually perpendicular to each other.

12. The insert holder (22) according to claim 11, wherein:
the bottom surface (36) is provided with a shim screw hole (42); and
the shim screw hole (42) and the insert fastening hole (58) are generally perpendicular to each other.

13. The insert holder (22) according to claim 1, wherein:
the bottom surface (36) is provided with a shim screw hole (42); and
the shim screw hole (42) and the insert fastening hole (58) are generally perpendicular to each other.

14. A cutting tool (20), comprising:
the insert holder (22) according to claim 1; and
a tangential cutting insert (24) releasably retained with a fastener (28) in the insert pocket (26).

15. The cutting tool (20) according to claim 14, wherein the tangential cutting insert (24) comprises:
two opposing end surfaces (66); and
a peripheral side surface (68) extending therebetween, the peripheral side surface (68) comprising:
two identical opposing major side surfaces (70); and
two identical opposing minor side surfaces 72, wherein;
in a top view of the tangential cutting insert (24), each major side surface (70) is concave with a centrally situated recess (74) extending between the end surfaces (66);
the first and second base abutment surfaces (60, 62) abut an operative major side surface (70) on one side of the recess (74); and
the third base abutment surface (64) abuts the operative major side surface (70) on the other side of the recess (74).

16. The cutting tool (20) according to claim 15, wherein the cutting insert's major side surfaces (70) are non-ground.

\* \* \* \* \*